United States Patent
Wilkes (10) Patent No.: US 7,147,597 B2
(45) Date of Patent: *Dec. 12, 2006

(54) METHOD OF FABRICATION OF GUSSETED FLEXIBLE BOTTLE WITH FITMENT

(76) Inventor: Kenneth R. Wilkes, 39 Sunset Summit, Asheville, NC (US) 28804

( * ) Notice: Subject to any disclaimer, the term of this patent is extended or adjusted under 35 U.S.C. 154(b) by 0 days.

This patent is subject to a terminal disclaimer.

(21) Appl. No.: 10/932,516

(22) Filed: Sep. 1, 2004

(65) Prior Publication Data

US 2005/0026761 A1 Feb. 3, 2005

Related U.S. Application Data

(63) Continuation-in-part of application No. 10/195,097, filed on Jul. 11, 2002, now Pat. No. 6,832,852, which is a continuation-in-part of application No. 10/133,436, filed on Apr. 27, 2002, now abandoned.

(51) Int. Cl.
*B31B 1/90* (2006.01)

(52) U.S. Cl. .................. 493/212; 493/87; 493/210; 53/133.1; 53/133.2

(58) Field of Classification Search .............. 493/87, 493/105, 108, 129, 212, 214, 215; 53/133.1, 53/133.2
See application file for complete search history.

(56) References Cited

U.S. PATENT DOCUMENTS

| | | | | |
|---|---|---|---|---|
| 3,380,646 A | | 4/1968 | Doyen et al. ............... 229/57 |
| 4,658,434 A | * | 4/1987 | Murray ..................... 383/66 |
| 4,669,124 A | * | 5/1987 | Kimura ..................... 383/80 |
| 5,324,233 A | * | 6/1994 | Owensby et al. .......... 493/190 |
| 5,348,525 A | * | 9/1994 | Buchanan ................. 493/213 |
| 5,484,375 A | * | 1/1996 | Owensby et al. .......... 493/190 |
| 5,660,477 A | | 8/1997 | Ichikawa ................... 383/80 |
| 5,855,544 A | * | 1/1999 | Buchanan ................. 493/102 |
| 5,918,984 A | | 7/1999 | LaFleur et al. ............. 383/8 |
| 6,126,315 A | | 10/2000 | Ichikawa et al. ............ 383/43 |
| 6,193,416 B1 | | 2/2001 | Kawamata et al. ......... 383/104 |
| 6,220,702 B1 | * | 4/2001 | Nakamura et al. ........... 347/86 |
| 6,549,744 B1 | | 4/2003 | Terazawa et al. .......... 399/262 |
| 6,695,757 B1 | * | 2/2004 | Edwards et al. ............ 493/51 |
| 6,810,636 B1 | * | 11/2004 | Resterhouse ............. 53/133.2 |
| 6,860,406 B1 | * | 3/2005 | Kobetsky et al. ............ 222/92 |
| 6,958,033 B1 | * | 10/2005 | Malin ....................... 493/102 |
| 2005/0123222 A1 | * | 6/2005 | Wilkes ...................... 383/120 |

* cited by examiner

*Primary Examiner*—Hemant M. Desai
(74) *Attorney, Agent, or Firm*—Saul Epstein (57) ABSTRACT

A method for fabricating a fitmented flexible bottle is disclosed which involves feeding webs including one or more gussets, creating perimeter seals around only the top portion of the bottle, inserting the fitment from the input end of the machine in the direction of web travel, forming the remainder of the perimeter seams, detaching the nascent bottle from the web, and sealing the neck section of the bottle to the fitment by clamping the neck section with a heated clamp, and preferably repeating the seal operation at a different radial angle. Sealing the fitment by application of ultrasonic energy is also disclosed. In another embodiment, the fitment is sealed to the neck section of the bottle by utilizing heated wheels against the neck and rotating the bottle to create a seal all around the neck.

43 Claims, 11 Drawing Sheets

METHOD OF FABRICATION OF GUSSETED FLEXIBLE BOTTLE WITH FITMENT

PRIOR APPLICATIONS

This is a Continuation-In-Part of application Ser. No. 10/195,097, filed Jul. 11, 2002 now U.S. Pat. No. 6,832,852, which was a Continuation-in-Part of application Ser. No. 10/133,436, filed Apr. 27, 2002 (now abandoned).

BACKGROUND OF THE INVENTION

"Stand-up" plastic pouches or bottles for holding liquids and other pourable products have become very popular, in part because of the desire to minimize solid waste, in part because of cost, and in part for other reasons. An early stand-up pouch design (U.S. Pat. No. 3,380,646) was devised by the Doyen Brothers in France. That pouch design, including many variants, is still in use today. It is, in fact, the dominant style. The basic Doyen design consists of two flat sheets seamed together along their sides, with a "W" fold running along the bottom. When the pouch is filled, the "W" opens and provides a base on which the pouch can stand. The original Doyen design showed the top being sealed straight across, but subsequent modifications include fitments to allow the pouch to be reclosed after opening.

One difficulty in adding a fitment to a Doyen pouch (and to other pouch designs as well) is that, according to prior art fitment sealing methods, the fitment must be of the "canoe" style to create a joint that can be reliably sealed. The canoe type of fitment is an attempt to minimize the change in direction of pouch material as it comes into contact with the fitment, and in so doing, improve the integrity of the joint where the two sides of the pouch come together at the fitment. However, even the use of a canoe shaped fitment does not completely solve the difficulties in sealing a fitment into a pouch, and a more reliable sealing means is desirable. The present invention provides such a means.

A "canoe" style fitment is characterized by having a sealing surface that includes relatively sharp changes in direction around the sealing periphery so as to permit the pieces of material being sealed to the fitment to approach the fitment sealing surface (laterally) at relatively shallow angles. Or, put another way, as two webs separate to go around the fitment in opposite directions, the angle of divergence is relatively small. Canoe style fitments are illustrated in, e.g., U.S. Pat. No. 5,660,477, U.S. Pat. No. 4,415,085, and U.S. Pat. No. 4,732,299.

Gusseted bottles (but without fitment) have been made in the past (see U.S. Pat. No. 6,193,416, Kawamata et al., U.S. Pat. No. 6,126,315, Ichikawa et al., and U.S. Pat. No. 5,918,984, LaFleur et al.) Obviously, without a fitment, these prior art containers do not have the utility of bottles with fitments.

SUMMARY OF THE INVENTION

A pouch or bottle which is to be fabricated using the present invention could, but preferably does not, utilize canoe style fitments. The method involves fabrication from flexible films (i.e., thin plastic, foil, paper, or the like) fed as webs from rolls of material. The bottle resulting from the process disclosed herein includes a gusseted body section that opens so as to form a substantially regular polygonal body cross section. The gussets are terminated at the bottom of the bottle to form a substantially flat base, providing stability when the bottle is partially or wholly filled. The top portion of the bottle includes a fitment passing through a necked down portion of the bottle. The fitment is preferably sealed to the neck in two or more sealing operations carried out at different radial angles, preferably, but not necessarily, about 90°, thus assuring an adequate seal between the fitment and the bottle neck around the entire periphery of the fitment. Alternatively, the sealing can be accomplished by running one or more heated wheels around the area to be sealed, applying pressure.

For purposes of clarity, as pictured herein the fitment is illustrated as having a circular base and no closure. It will be appreciated that threaded, snap, and/or other types of closures may be used, even though none is shown in the figures. Also, the shape of the fitment base need not be circular.

While canoe style fitments can be used in connection with the present invention, "cylindrical base" fitments (as defined herein) are preferred. The sealing surface (or "base") of a cylindrical base style fitment (as that term is used in the present application) is preferably (but is not necessarily) substantially parallel to the axis of the fitment, as in the canoe style, but it does not include external corners at sharply acute angles around its circumference, as do canoe style fitments. Rather, in accordance with a first style of cylindrical base fitment, the circumference is preferably comprised of smooth and preferably convex curves. Having the circumference comprised of smooth curves is intended to facilitate the sealing of web material to the base of the fitment with two overlapping sealing steps applied from different directions. The cross sectional shape of the sealing area of a cylindrical base fitment is preferably circular, but may be oval, or have some other curved shape. While the word "cylindrical" is used herein to help define a "non-canoe" style of fitment, it should be understood that the fitment base may be tapered somewhat (axially) to facilitate insertion or for other reasons.

Figure 15:
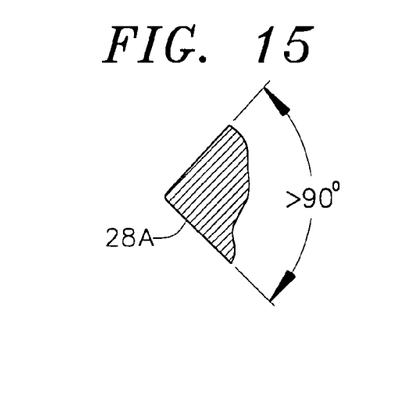
FIG. 15 is a fragmentary sectional view of the base section of a fitment which could be used in connection with the invention.

Alternatively, instead of the sealing surface area of a cylindrical base fitment being comprised of smooth curves, the sealing surface of a second style cylindrical base fitment (as that term is used in this specification) may include intersections at an angle, provided that the angle is not so acute as to make a second sealing step difficult or impractical. Intersection angles that are greater than about 90° are generally deemed to be satisfactory, hence the term "cylindrical base", as used in this specification, refers to the base (i.e., the sealing surface) of a fitment wherein the webs of material surrounding and sealed to the fitment diverge at angles greater than about 90° as they separate to encircle the fitment. FIG. 15, which is a fragmentary sectional view of one style of cylindrical base fitment, illustrates the approximate minimum angle of approach of surfaces of what is termed here as a "cylindrical base" fitment. The base of a cylindrical base style of fitment could, for example, have a hexagonal shape (in cross section).

The preferred method of fabrication generally includes the following steps, although not necessarily in this order. Also, some of the steps can be accomplished by alternate means:

1. feeding two or more webs of material in face to face contact into a fabricating machine, the webs including one or more gussets,
2. creating perimeter seals for the bottle around a part of the circumference, including the neck section of the bottle, and, if desired, shaping the bottle by cutting away areas at the edges of the webs,
3. separating at least one of the incoming webs from the remainder of the webs upstream of the neck section and inserting a fitment into the neck section of the bottle, the insertion motion into the neck being made from the direction of what eventually will become the bottom of the bottle,
4. forming the remainder of the perimeter seals of the bottle,
5. severing the bottle from the web,
6. clamping the bottle material to the fitment with a heated clamping means to create a seal between the bottle material and the fitment,
7. Clamping the bottle material to the fitment with a heated clamp a second time, the second clamping being at a different radial angle.

BRIEF DESCRIPTION OF THE DRAWINGS

FIGS. 13A and 13B are schematic views of one process step in the fabrication process for making an alternate embodiment of the invented bottle. FIG. 13A is a top view of the web and 13B a side view taken at the time the step is being performed.

DETAILED DESCRIPTION OF THE INVENTION

The present invention involves fabricating a bottle from webs of flexible heat sealable plastic, foil, paper, or similar material. The following description describes the invention in connection with a "one up" process, however, it will be appreciated by those skilled in the art that "two up" or even more bottles can be made in parallel using the principles described herein.

There are many different web material compositions that could be suitable for the bottle, depending on the circumstances, and all of the webs do not necessarily have the same composition. It may, for example, be desirable to have some portions of the completed bottle stiffer than others, which can be accomplished by having differing compositions, or by using differing web thicknesses. Or, it may be desired that one or more faces of the bottle be foil, while the others are plastic. Other factors may also dictate differences in web composition.

In addition to any requirements that may be imposed on the materials as a consequence of the proposed use of the bottle, in order to be amenable to the preferred method of manufacture as described below, a composite sheet is generally used. It is preferable that the sheets (or webs) have one heat sealable surface, and the other not heat sealable. In other words, the sheets used are preferably such that one face of a first sheet is heat sealable to an abutting face of a second sheet, whereas the second face of the first sheet will not form a bond to the second face of the second sheet (at least not at the temperatures and pressures used to bond the first faces). It will be appreciated that the preferred method of manufacture could be modified to permit the use of materials, both faces of which are heat sealable.

One material that has been found to work well for fabricating items such as described herein is a polyester sheet having a coating of low density polyethylene on one face. Many other materials are also suitable, the one mentioned merely being illustrative. The low density polyethylene coating has the property of being able to be sealed to a like coating on another sheet, but the polyester base sheet will not seal to another sheet of polyester. This selective sealing property of the film used permits gussets in the web to be conveniently formed, (i.e., without sealing the inside faces of the gussets to each other), yet permitting other laminations to be sealed to the gussets, as will be described below.

Figure 1A:
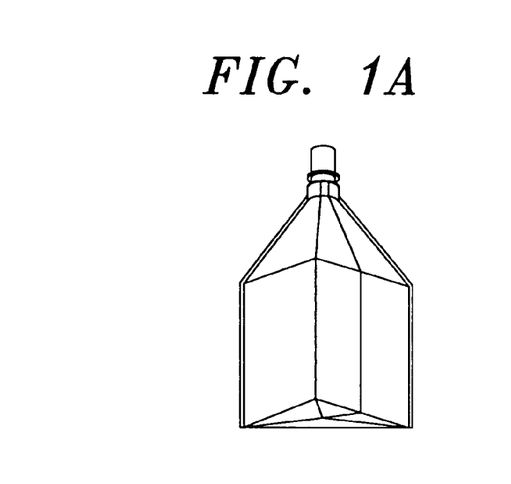
FIGS. 1A, 1B, and 1C are trimetric views of completed and filled bottles made according to the invention having 3, 4, and 5 sides.
Figure 1B:
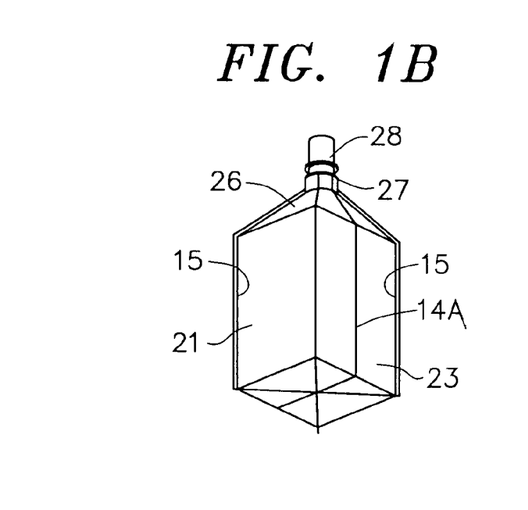
Figure 1C:
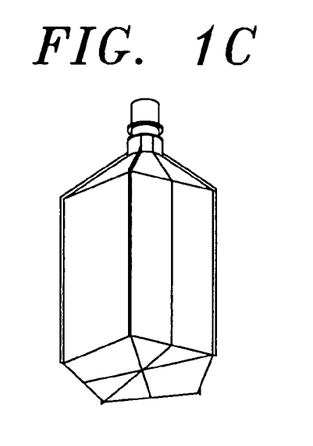
Figure 2A:
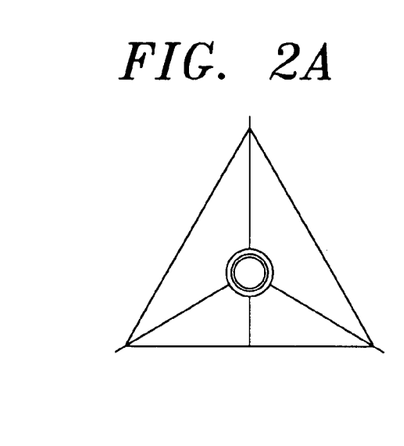
FIGS. 2A, 2b, and 2C are top views of the bottle shown in FIGS. 1A, 1B, and 1C.
Figure 2B:
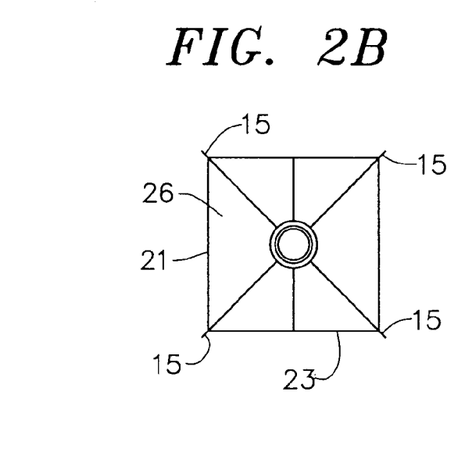
Figure 2C:
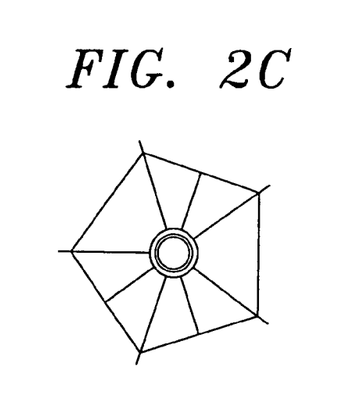

FIGS. 1A, 1B, and 1C illustrate a three sided, a four sided, and a five sided bottle, respectively, that can be made using the process described herein. FIGS. 2A, 2B. and 2C are top views corresponding to FIGS. 1A, 1B, and 1C. It will be appreciated that bottles with any number of sides, three or more, can be fabricated, at least in theory. Manufacturing practicalities may limit the number of sides that can be produced economically.

Figure 3A:
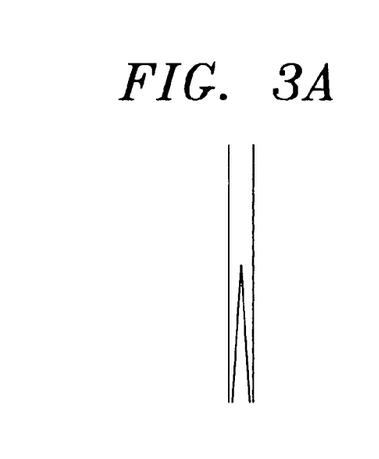
FIGS. 3A, 3B, and 3C are end on views of the webs used to form the bottles of FIGS. 1A, 1B, and 1C.
Figure 3B:
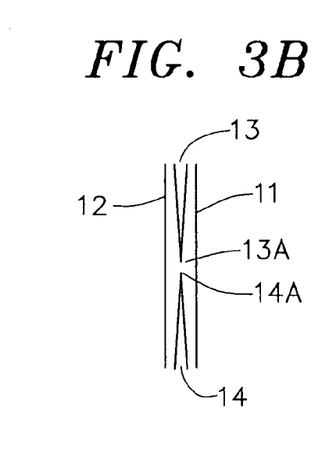
Figure 3C:
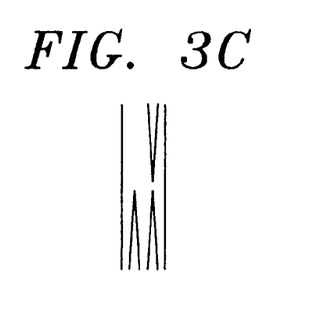

FIGS. 3A, 3B, and 3C illustrate the relative positions of the various webs (in a "one up" configuration) of three sided, four sided, and five sided bottles as they pass through the fabrication process. For clarity, the webs are shown separated, and the seams not made. The following description of the fabrication process is of a four sided bottle, but it will be understood that the process for any number of sides is substantially the same, the primary difference being the number of gussets involved and the angle that the bottom is cut (as will be discussed below).

In the description which follows, the four sided bottle being fabricated is described as though it were fabricated from four webs (in a "one up" configuration), but it will be appreciated that it is contemplated that fabrication in accordance with the method described could be accomplished using as few as two webs. For descriptive purposes, the webs during the course of fabrication will be referred to as "top", "bottom", "left center", and "right center", corresponding to their relative positions when passing through the first stages of fabrication. After fabrication, what were originally the top and bottom webs (sometimes called laminations), will form two opposite panels of the completed bottle (called "front" and "back" for convenience), and will also form part of the top and bottom portions of the bottle. The center webs (the gussets) will form side panels, and also be part of the top and bottom portions of the bottle. The neck, being a part of the top portion of the bottle, is formed from extensions of the front, the back, and the gusseted side panels.

The constituent webs of a four sided bottle are top web 11, bottom web 12, left center web 13 and right center web 14. The two center webs are folded, and form gussets in the finished product. The numerals 13A and 14A indicate the inner extent of the gusset folds.

While the webs 11, 12, 13, and 14 are discussed herein as if they were separate pieces of material at the outset, it will be appreciated that any number of the seams between the webs could be "pre-made", as by folding one or more of the source webs to create the effect of a seam or seams. For example, if it were desired to fabricate a square bottle from two webs instead of four, the bottom, left center, and right center webs could be a single folded web, instead of three separate webs.

It will also be appreciated that when the bottle is complete, and contains liquid, the gussets will be open, and the bottle will have a substantially polygonal cross section, the number of sides of the polygon depending on the number of gussets. Additionally, as will be noted below, even though the body cross section is substantially polygonal, the body may be shaped with pleasing curves in the vertical direction. When partially or completely full, the bottle is remarkably stable.

The faces of the top and bottom webs 11 and 12 that are coated with sealable material, (i.e. the low density polyethylene in the case of the illustrative web material) face toward the interior of the bottle, whereas the coated faces of the center webs 13 and 14 face outward of the gussets. Hence, it will be appreciated that when a sandwich including all of the webs is subjected to heat and pressure, only those faces which are coated with low density polyethylene will form seams, and the inside surfaces of the gussets (which are not coated) will not adhere.

Figure 19:
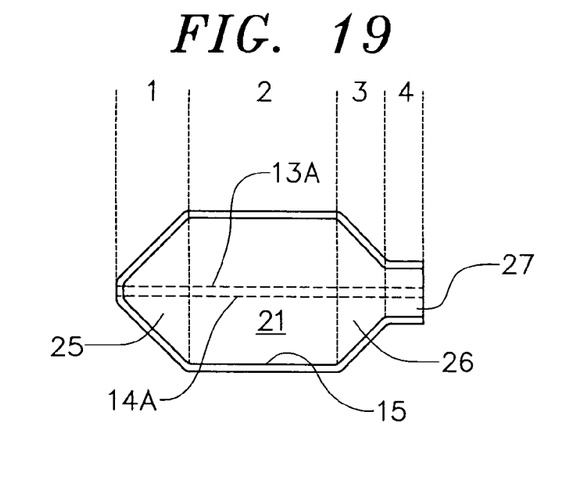
FIG. 19 is a flattened top view of a bottle made according to the invented method, without fitment.

FIG. 19 depicts the outline of a completed four sided bottle, (except without the fitment), and with the gussets folded. What can be seen is top web 11, and the seam pattern 15. Section 1 is the bottom, Section 2 is the body, Section 3 is the transition, and Section 4 is the bottle neck (where the fitment is placed). The dashed lines 13A and 14A indicate the folds of the gussets. The edges of the webs at section 1 preferably taper inward at approximately a 45° angle, terminating at approximately the inside edges of the gussets. Alternatively, the bottom of a four sided bottle could be cut straight across, without the 45° cuts, and a bottle made in this manner would unfold to a flat bottom, as does the 45° cut embodiment. However, it has been found that such a bottom does not result in quite as stable a structure as does the 45° cut bottom, hence it is not presently preferred.

The optimum angle of cut depends on the number of sides the finished bottle will have. For example, a three sided bottle is preferably cut at about 60° from the direction of web feed. Or, more generally, the included angle between the side cuts (angle A in FIG. 19) is preferably equal to about 360/N degrees, where N is the number of sides. In a six sided bottle, therefore, the included angle is preferably about 60 degrees. Consequently, it will be appreciated that a view such as FIG. 19 of bottles having other than four sides would appear similar to FIG. 21, except that the angle at which the bottom is cut would depend on the number of sides.

Figure 20:
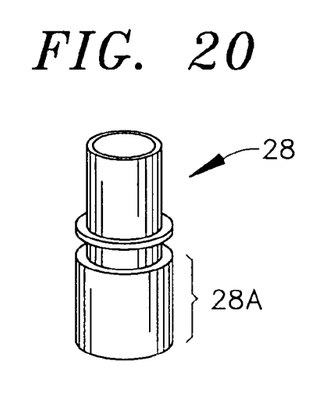
FIG. 20 is a trimetric view of a representative fitment for use in a bottle made according to the invention.

FIG. 20 is a trimetric view of a representative fitment 28, with the numeral 28A indicating the base of the fitment. The "base" of a fitment is that part of the fitment that is intended to be sealed to the neck section of the container to which it is attached. A round base is illustrated, but as noted above, other shapes are also contemplated.

A representative method of fabricating the invented bottle is illustrated in FIGS. 4 through 9. The "A" portion of each figure is a plan view showing the webs at a particular stage in the fabrication process as the webs pass through the fabricating machine, while the "B" portion is a side view at the same stage. In order to promote clarity, all figures are somewhat schematic in nature. Since fabrication is a continuous repetitive process, the point in the process where explanation starts is somewhat arbitrary.

In general terms, in accordance with one embodiment of the invention, the fabrication process proceeds as follows:

1. The perimeter seams which form the top portion of a bottle (at least the neck section) are formed (by the application of heat and pressure, or alternatively by ultrasonic or by other means). At substantially the same time the extra material around at least the neck is preferably removed by "notching" the edges of the webs.
2. The fitment is inserted.
3. The partially formed bottle is then moved forward and attached to a suitable transport mechanism, for example the "turret" illustrated in the drawings.
4. The remainder of the perimeter seams are formed. The top portion for the next bottle can be formed at the same time. The bottle may be detached from the web at this point.
5. The nascent bottles are moved to the next station (i.e., the turret is rotated) and the joint between the neck of the bottle and the fitment is sealed in two operations, the bottle being turned (preferably about) 90 degrees between sealing operations. Alternatively, of course, the sealing mechanisms (or possibly a single mechanism) could apply the pressure from differing angles.

Figure 4A:
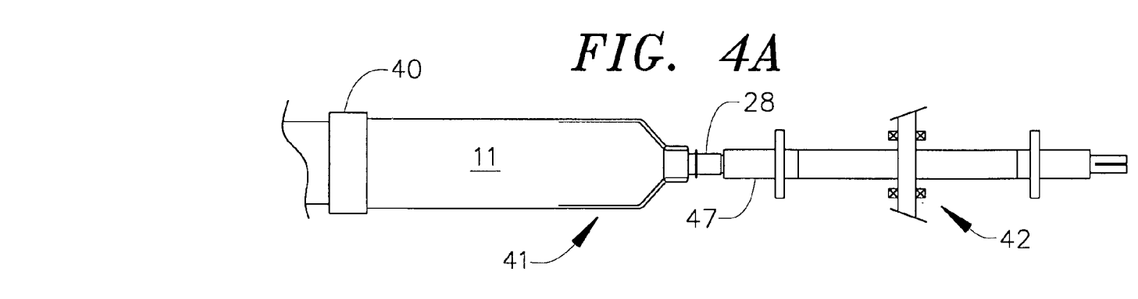
FIGS. 4 through 9 are schematic views of various steps of the presently preferred fabricating process, as performed in a fabricating machine. The Figures marked "A" are top views of the web during the process step, whereas those marked "B" are side views at the same point in time.
Figure 4B:
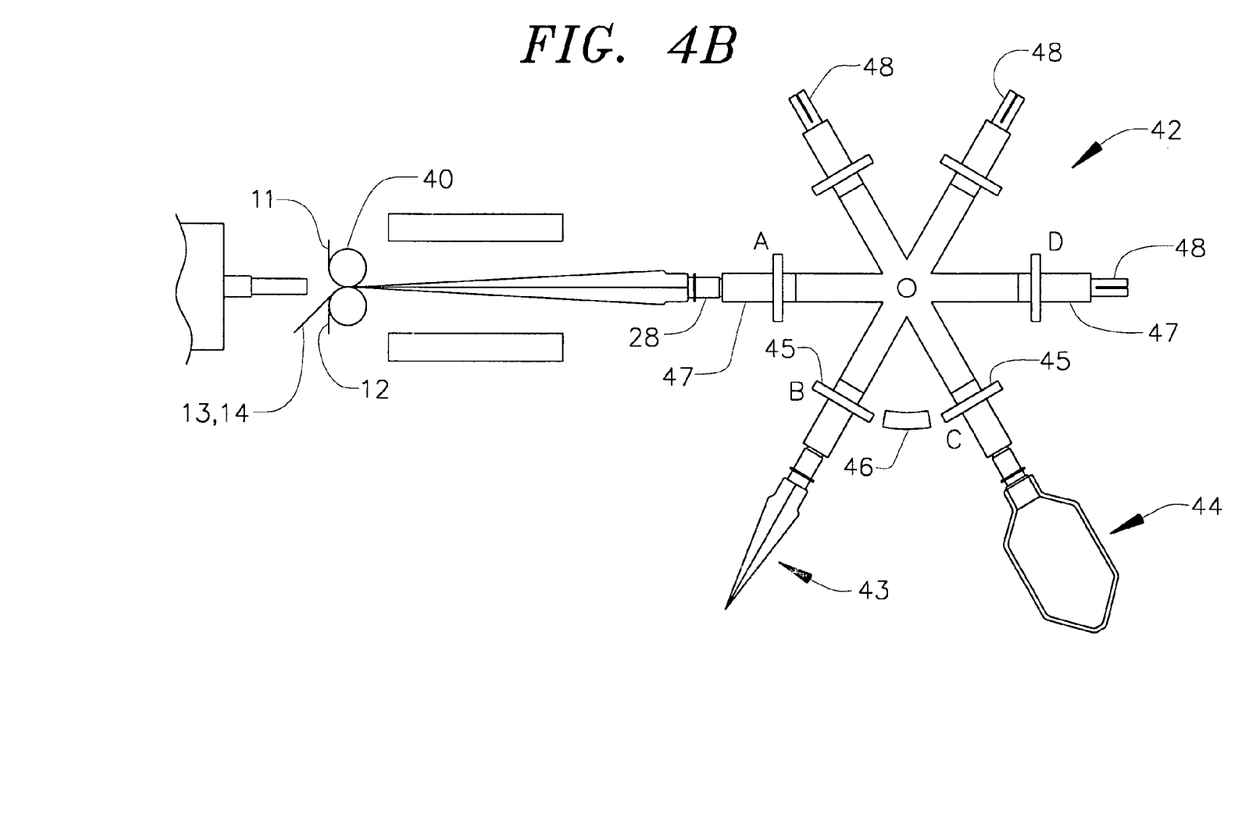

For greater detail of the fabrication process, first refer to FIG. 4, where the webs 11, 12, 13, and 14 are seen being fed into the fabricating machine around a pair of idler rolls 40. A first nascent bottle 41 is seen being held at the end of an arm 47 of turret 42 at station A {the holding means (48) will be described later}. At the time depicted in FIG. 4, the top portion of the perimeter seams for bottle 41 have been formed, and the fitment 28 has been placed, but the bottom portion of the bottle is still unseamed. In the embodiment illustrated, perimeter seams for the neck, transition and body sections have been formed at this time. Alternatively, it may be convenient to seam only the neck, or the neck and transition portions at this time. Partially completed bottles 43 and 44 are attached to the turret at stations B and C. Turret 42 is rotatable by means not shown.

Figure 5A:
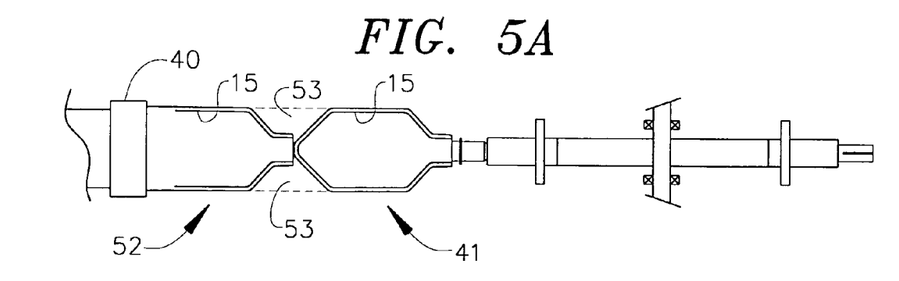
Figure 5B:
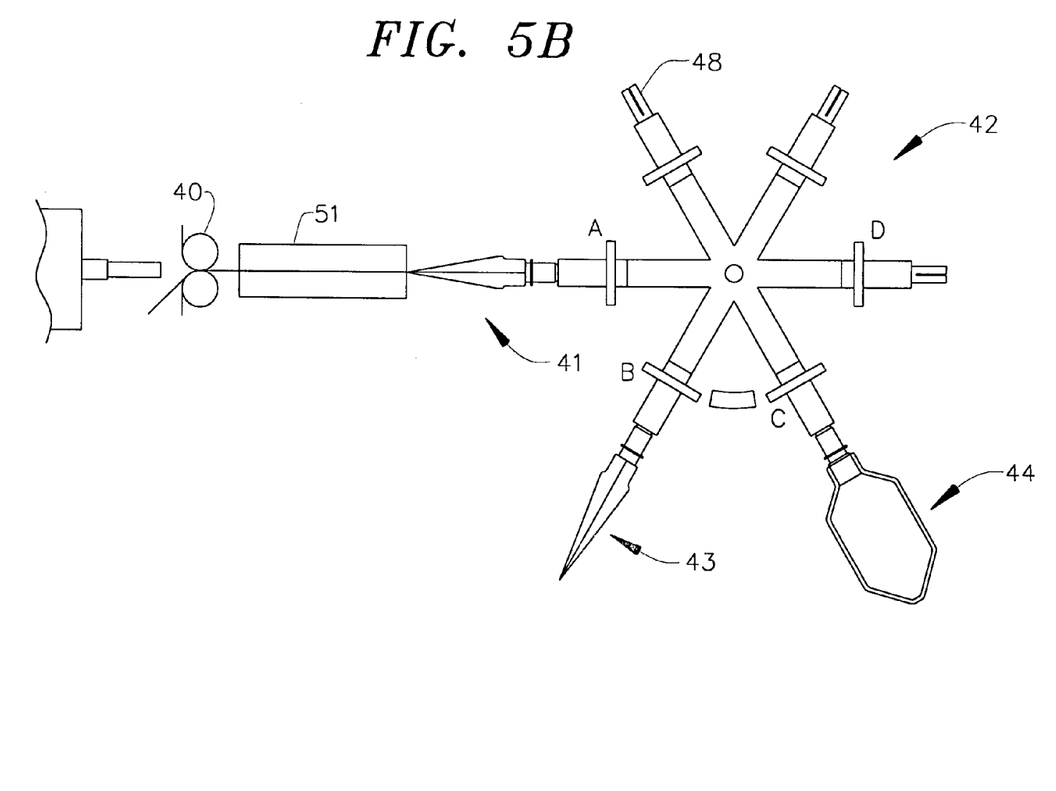

At the next step, as shown in FIG. 5, seaming iron 51 has closed on the web, and is forming the top portion of the perimeter seams (15) for the next bottle (52), as well as the bottom portion of the perimeter seams for the bottle 41. When seaming iron 51 clamps the webs together, as noted previously, the inside surfaces of the gussets (not being coated) will not adhere, but seams will be formed between the gusset material and the top and bottom webs (since these abutting faces are coated with sealable material).

Figure 10:
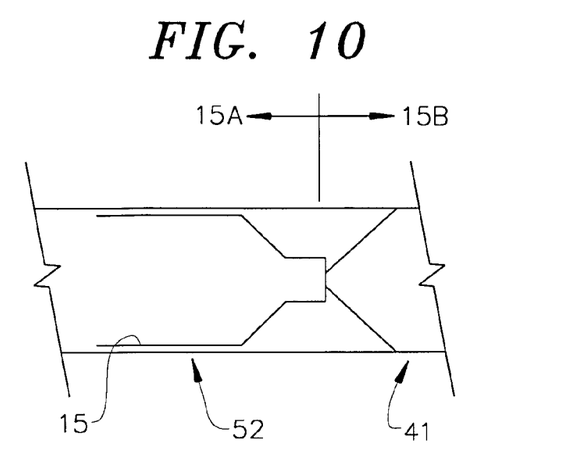
FIG. 10 depicts a seam pattern made by the seaming iron in accordance with one embodiment of the fabricating machine.

FIG. 10 illustrates an exemplary pattern of the perimeter seams 15 formed by seaming iron 51. The numeral 15A indicates the seams for the top portion of one bottle, while 15B indicates the seams for the bottom portion of the prior bottle. For clarity, only the seams made at one closing of seaming iron 51 are shown in the figure.

At the same time as the perimeter seams are being formed by seaming iron 51 (as illustrated in FIG. 5), a notching means—which may be integral with the seaming iron—cuts the extraneous material (indicated by the numeral 53) from around the neck and transition areas of the bottle being formed, and also severs the web between bottles 41 and 52. The extraneous material (53) is commonly removed from the area by a vacuum system, and is discarded.

Figure 6A:
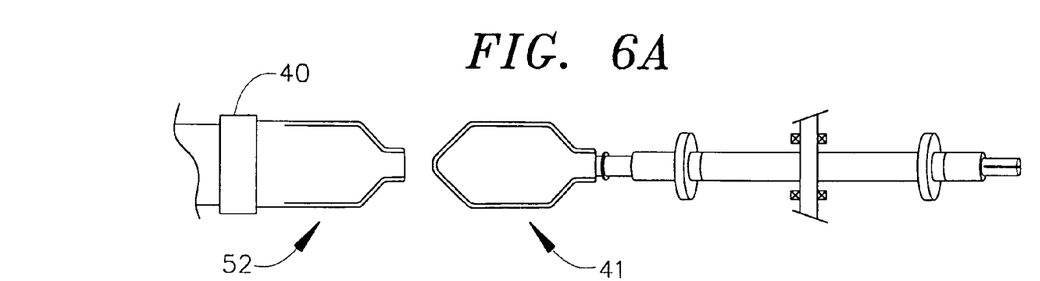
Figure 6B:
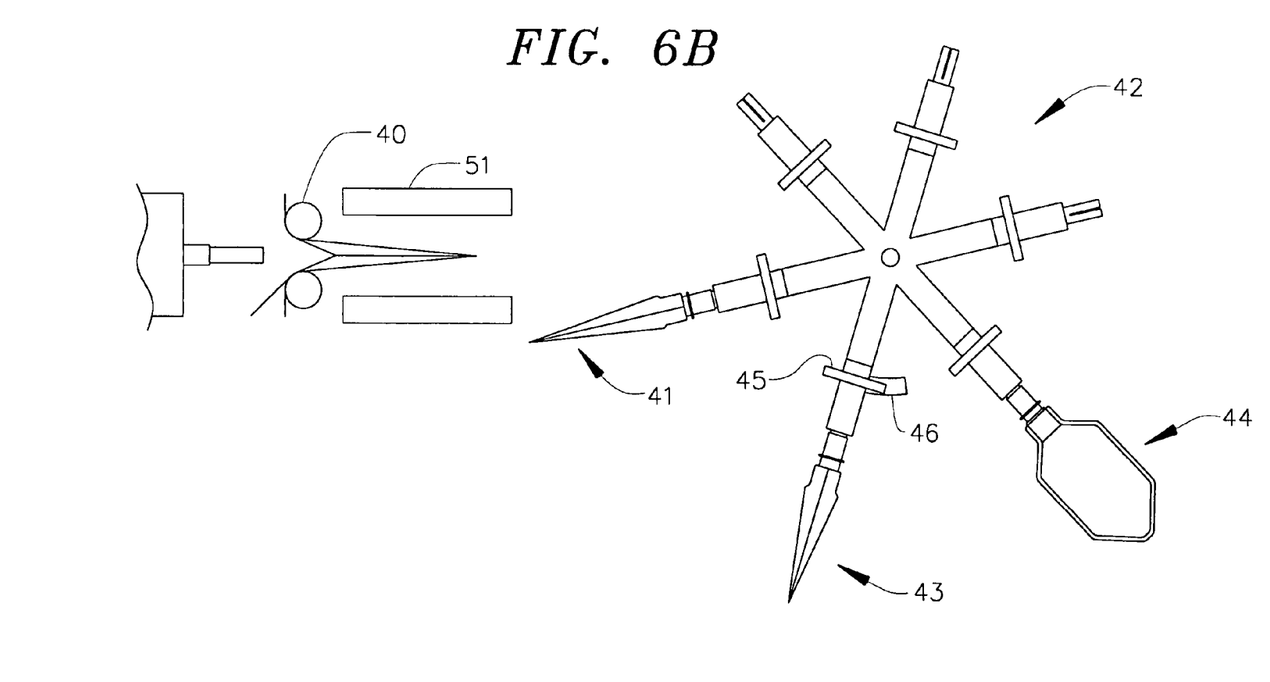

After the perimeter seams have been formed as described in the preceding paragraphs, and the web severed, the turret is rotated so that bottle 41, which was at station A, is rotated 60° (counterclockwise as viewed in the drawings) to station B. As the turret rotates, the seaming iron 51 members separate, as do the rollers comprising idler rolls 40. This is illustrated in FIG. 6.

Figure 7A:
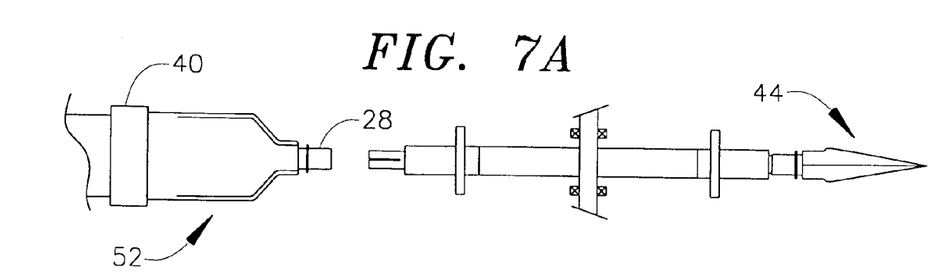
Figure 7B:
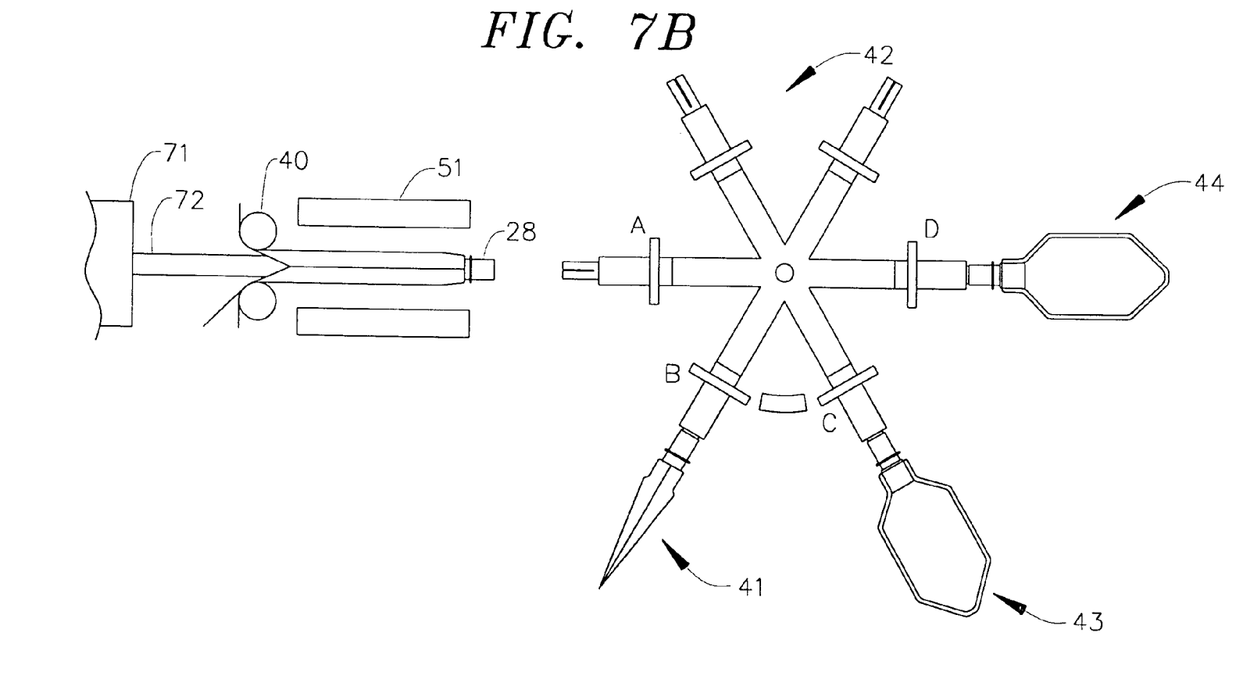
Figure 8A:
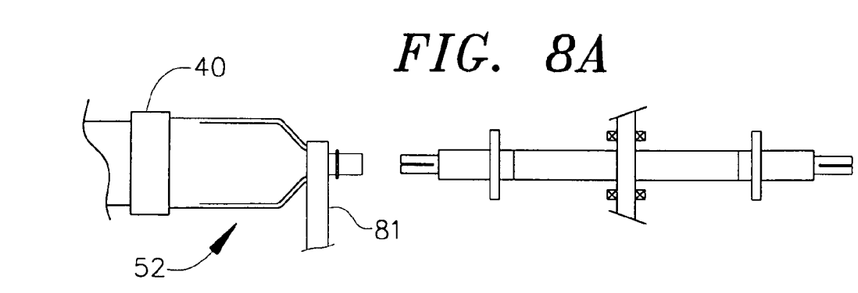
Figure 8B:
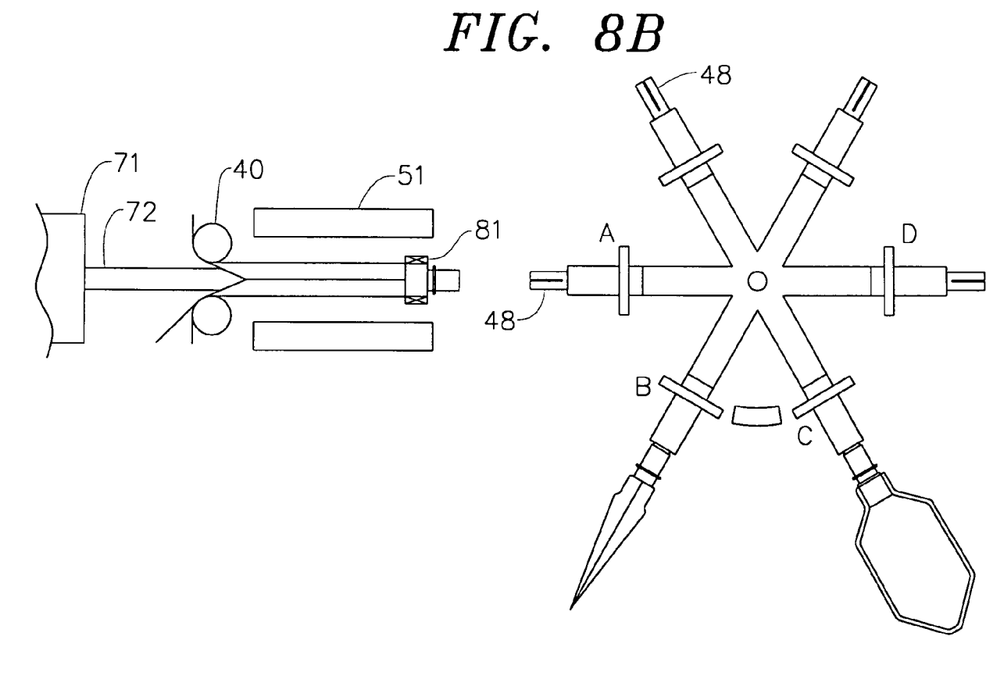

When the idler rolls 40 are far enough apart, fitment driver 71 drives mandrel 72 (which has a fitment 28 positioned on its end) in through the open bottom of the bottle in process, and positions the fitment in the neck section of the bottle (FIG. 7). Fitment handling and positioning on the mandrels such as mandrel 72 is known in the art and therefore is not further described. The fitment should fit reasonably closely to the neck section of the bottle so that wrinkles do not appear when the neck is sealed to the fitment. The maximum looseness of fit depends in great measure on the particular circumstances, but in general, if the inner circumference of the neck is more than about 3% larger than the circumference of the base of the fitment, there is a danger of wrinkling. It may be desirable to taper the base of fitment 28 somewhat as an aid to fitting it into the neck.

Figure 9A:
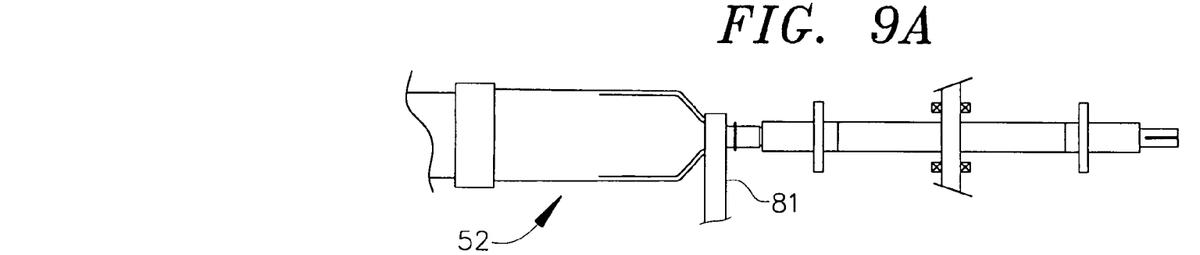
Figure 9B:
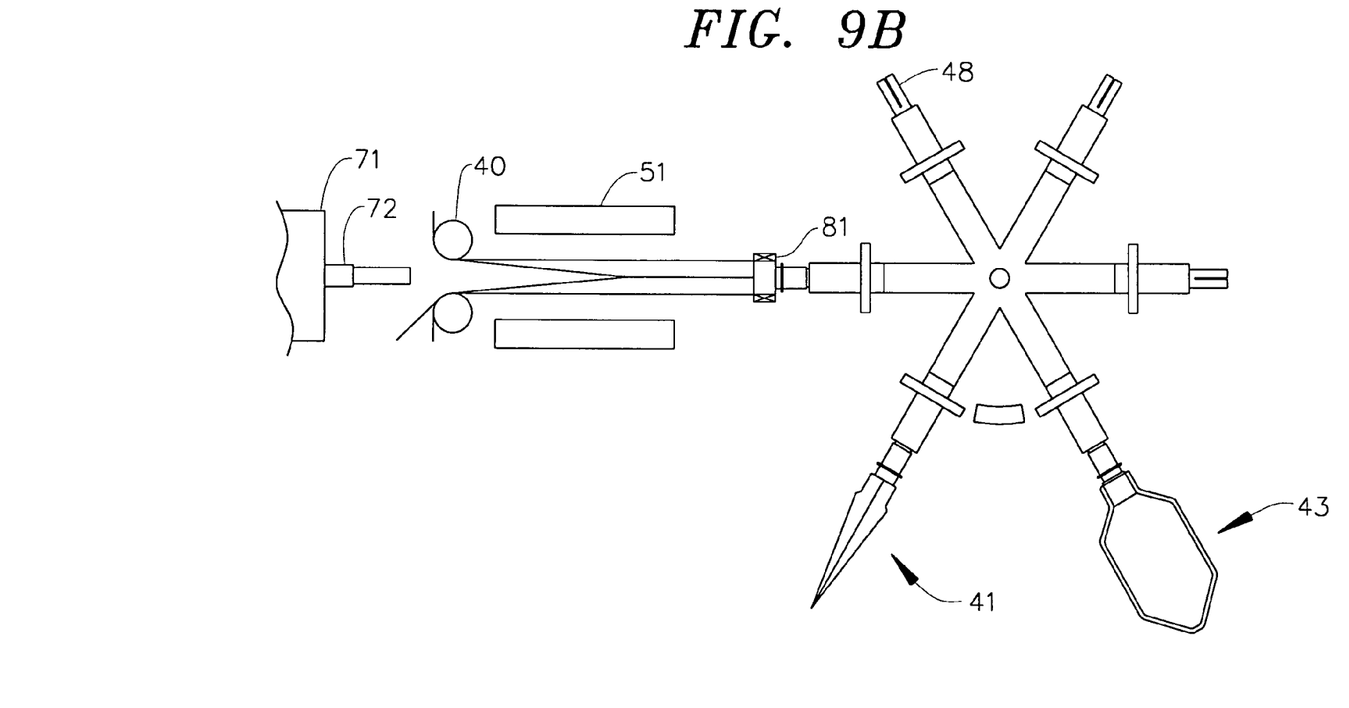

After the fitment 28 is in place, clamp 81 (FIG. 8) clamps the bottle neck 27 to the fitment 28. Clamp 81 is preferably heated so that a first (at least temporary) bonding of the bottle material to the fitment is accomplished. Clamp 81 is then moved to engage the fitment with an arm of the turret (FIG. 9). The end 48 of the arm on which the bottle is held, is preferably split, is compliant, and has a slightly larger diameter at its end than the hole in the fitment (so as to hold the fitment from the inside). As the clamp 81 moves the nascent bottle to the position shown in FIG. 9, the idler rolls 40 turn as the material feeds.

After the bottle is in position and is held by end 48, mandrel 72 is retracted. The clamp 81 is then released and moved back to its at rest position and a new fitment is positioned on the end of mandrel 72 (not illustrated).

At the end of the step described in connection with FIG. 9, the nascent bottle 52 that is held by an arm of the turret at station A is in same condition as bottle 41 was just before the step described in connection with FIG. 4. The next step, therefore, is to repeat the step of FIG. 4 by closing the idler rolls 40, following which the seaming iron 51 will create another set of perimeter seals, etc.

Stepping back to the time just after the rotation of the turret 42 to the position shown in FIG. 7, bottles 41, 43, and 44 can be seen attached at the ends of the arms 47 of the turret at stations B, C, and D. Bottle 44 is pulled off the turret arm at this time (by means not shown) and transferred to a packing station or to a bottle filling station.

Figure 11A:
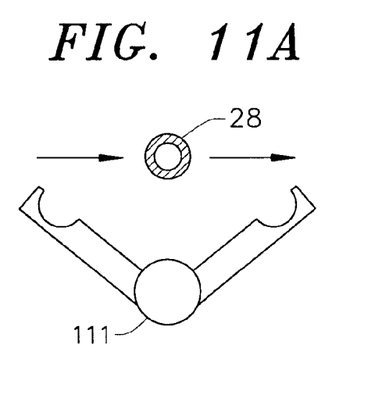
FIG. 11A is a top view of the seaming clamp used to create a seal between the bottle neck and the fitment, in an open condition.
Figure 11B:
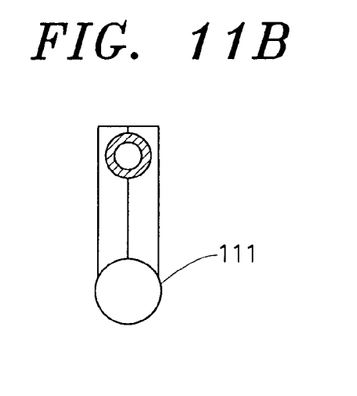
FIG. 11B is a top view of the seaming clamp used to create a seal between the bottle neck and the fitment, in the closed condition.

A heated clamp 111 (as shown in FIGS. 11A and 11B) is located at each of stations B and C. When the turret is stopped during the steps of FIGS. 7, 8, 9, 4, and 5, both clamps 111 are closed around the base 28A of fitment 28 of the bottles which are then at stations B and C, as indicated in FIG. 11B, creating seals between the neck and the fitment. Just before the turret begins to turn again (FIG. 7), the clamps open (FIG. 11A) to allow the turret to move. For clarity, the clamps 111 are not shown in FIGS. 4–9.

Alternatively, instead of using heat and pressure, as applied by heated clamp 111, to seal the bottle neck to the fitment, the seals can be effected by applying ultrasonic energy to the interface. Similarly, the perimeter seams also may be made by using ultrasonic energy. Ultrasonic sealing is well known, and need not be described further.

The ends of the turret arms 47 are rotatable with respect to the arms, and, to effect such rotation, each end includes a gear or friction wheel 45 that engages a mating rack or friction pad 46 fastened to the machine frame between stations B and C. The length of the rack 46 is such that each arm end (and attached bottle) turns about 90° between stations B and C. The heated clamps 111 at stations B and C (which are heated hot enough, and apply sufficient clamping pressure to form a seal between the web material and the fitment) therefore provide a uniform seal between the neck of the bottle 27 and the fitment 28 around the circumference. The use of two heated clamps 111 to apply pressure to the sealing area at different radial angles assures that the needed sealing pressure is exerted on the fitment at all areas around the entire circumference, and thereby provides complete and reliable sealing.

Alternately, instead of turning the bottles, the two clamps could be positioned so as to apply clamping force from different directions. Another alternate method of sealing, that would be suitable for use with symmetrical fitments, would be to use only one heated clamp, actuating it twice, and causing it move angularly between actuations. As yet another alternate, if clamp 81 is made to create a substantial seal, and not just a tack, only one clamp 111 need be provided. In that case, the single clamp 111 is positioned to apply pressure at a different radial angle from clamp 81. It will be clear that if clamp 81 is used to make the first seal, the bottle turning mechanism (gear 45 and rack 46) will not be needed, and at the same time, the number of stations could be reduced so that a four armed turret would be sufficient.

Figures 16, 17, 18:
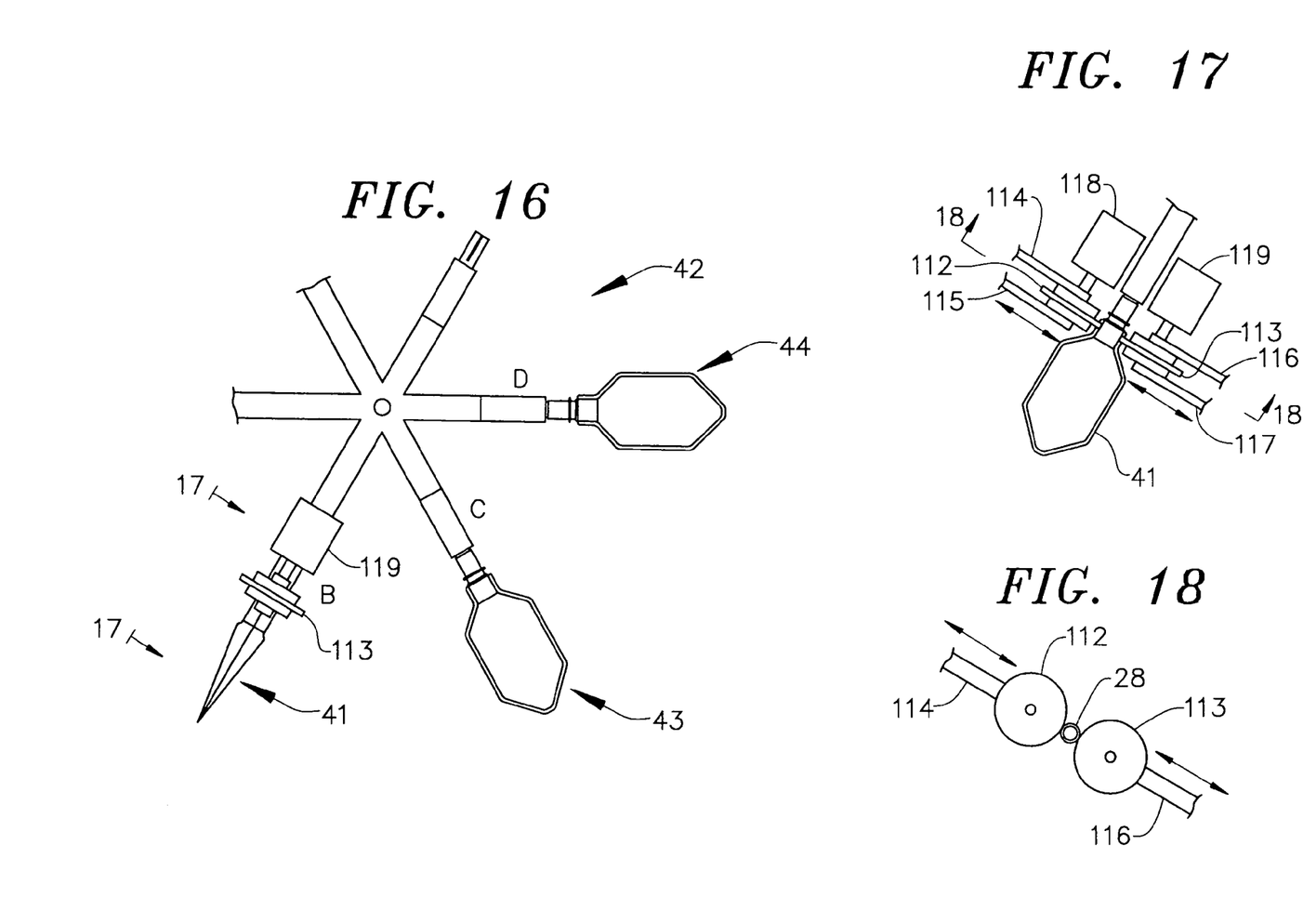
FIG. 16 is a fragmentary side view of the turret in the same position as illustrated in FIG. 7, showing another embodiment of the neck sealing means.
FIG. 17 is a fragmentary side view of the leg of the turret at station B, taken at 17—17 of FIG. 16.
FIG. 18 is a sectional view taken at 18—18 of FIG. 17.

Another alternate means for sealing the bottle neck 27 to the fitment 28 is illustrated in FIGS. 16–18. The neck sealing step is accomplished at station B, but a second sealing setup could be installed at station C, if desired. The sealing is done by pressing a pair of heated wheels 112 and 113 against the bottle neck and fitment and causing the wheels to rotate, which in turn causes the bottle to turn (the ends 47 of the turret arms being rotatable) creating a circumferential seal between the bottle and the fitment. If this means of sealing is used, the gear 45 and rack 46 to turn the bottle, as illustrated in FIGS. 4–9, are not used, but otherwise the initial steps for forming the bottle are substantially the same as discussed above.

As is well known in the art, the temperature of the wheels, the pressure they exert on the neck against the fitment, and the speed of rotation will cooperate in making a suitable seal. As shown, the wheels 112 and 113 are supported on arms 114–117 with the wheel axes substantially parallel to the axis of fitment 28. Arms 114–117 are mounted for reciprocal motion as indicated by the arrows in FIGS. 17 and 18. The means for supporting and moving the arms are not shown. Nor is the means for heating the wheels. The force pressing the wheels against the fitment may be generated by any convenient means, such as an air cylinder, a servo motor, or other means.

In operation, the wheels are initially in the open position to allow the turret to turn. When the turret is indexed bringing a bottle to station B, the support arms 114–117 are actuated, bringing the wheels into contact with the neck 27 and fitment 28 of the bottle (the position shown in FIGS. 16–18), and the appropriate force is applied. Motors 118 and 119 (which may already be turning) are used to turn the wheels at an appropriate speed to create a continuous seal. A continuous seal around the neck will be formed after about 180° of rotation of the bottle, but it may be desired to make a complete rotation, or more, to assure a seal. Alternatively, or additionally, a second seal station may be provided at station C to either go over the same sealing area, or to make a parallel seal. Also, while the above description discusses heat as the source of energy for creating the seal, as is well known, ultrasonic energy may also be used to create a seal. After the seal is made, the wheels are retracted to allow the turret to turn, and bring a new bottle to station B.

The net effect of driving wheels 112 and 113, and allowing the neck 27 to rotate as described above, is to cause the periphery of the wheels to traverse the circumference of the neck, thereby creating a seal around the neck. The same effect can be achieved by using a motor to rotate fitment 28, while having the wheels mounted on axles and free to turn. In still another embodiment, the fitment 28 and neck 27 can be stationary, and the axles on which wheels 112 and 113 are mounted can be rotated about the axis of the fitment. What is sought to be achieved is relative motion between the wheel axes and the neck and fitment so that the wheel peripheries traverse the circumference of the neck.

Figure 12:
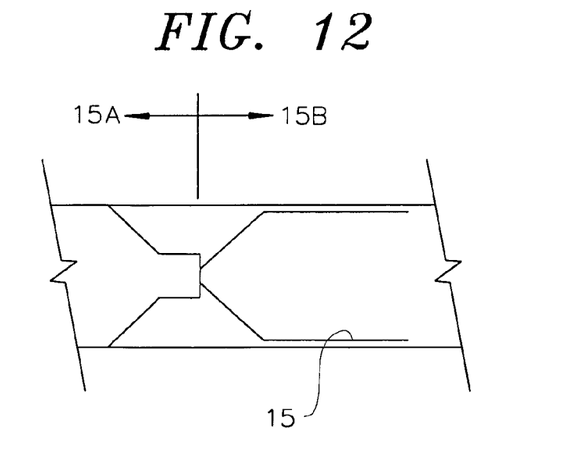
FIG. 12 depicts an alternate seaming pattern made by the seaming iron.

FIG. 12 depicts an alternate configuration of the seaming pattern for the perimeter seams. In the case of FIG. 12, the portion 2 (as shown in FIG. 19) is formed at the same time as portion 1 is formed, rather than at the time portions 3 and 4 are formed. Forming the seams in this manner will involve some differences in timing of the process, as will be apparent to those skilled in the art, but can be accommodated, if deemed convenient.

Figure 13A:
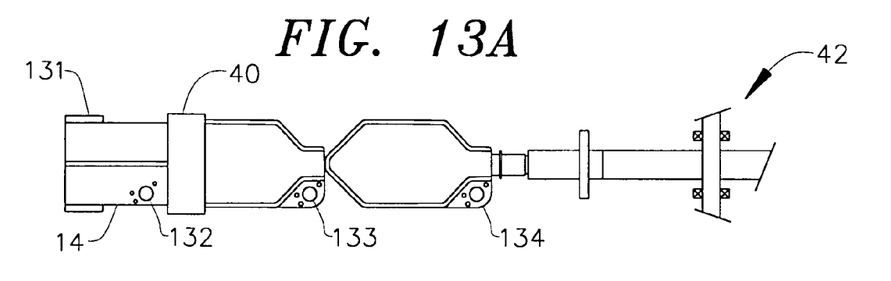
Figure 13B:
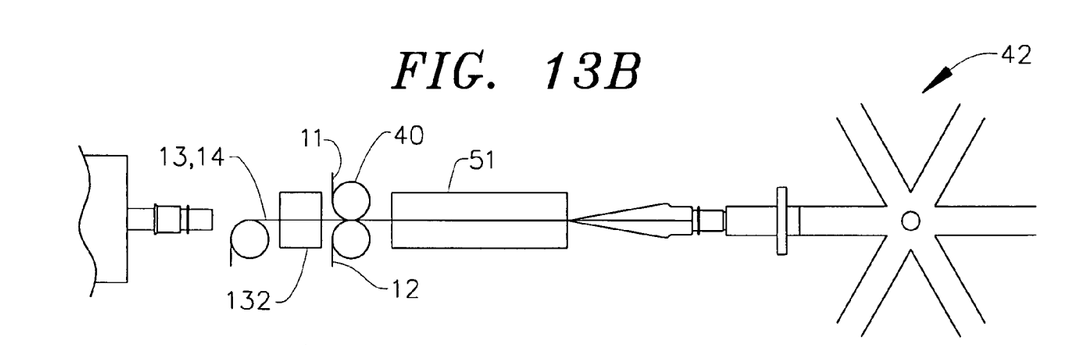

FIGS. 13A and B depict the fabrication of a bottle of the type shown in FIG. 1, except for the inclusion of a handle. The process is shown at the stage as depicted in FIG. 5, i.e., at the stage when the perimeter seals are being formed, and the excess material is cut away by notching means. In the embodiment shown in FIG. 13, the gusset webs 13 and 14 are introduced into the process prior to the introduction of the top and bottom webs 11 and 12. The gusset webs 13 and 14 are shown entering the process over idler roll 131. A hole punch 131 punches several small holes 132 through gusset web 14 at the first station. At the next stage, seaming iron 51 forms the perimeter seams as described previously, and also seals the top and bottom webs 11 and 12 together through the holes 132. At the same time, the notching means cuts a hole 133 through webs 11, 14, and 12. The remainder of the fabrication process is as described above in connection with the first embodiment, and the final product is a bottle having a handle 134.

Figure 14:
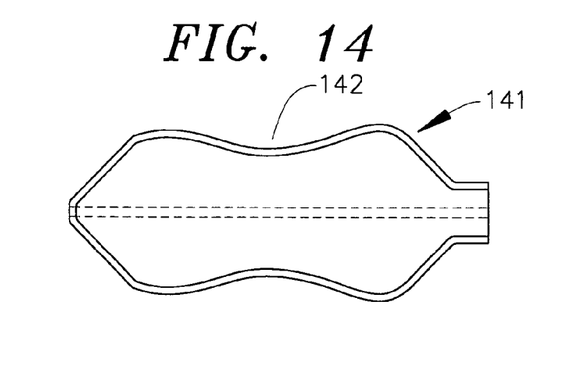
FIG. 14 is a plan view of a flattened bottle according to another embodiment of the invention, without the fitment.

FIG. 14 is intended to show that the body of the invented bottle need not have straight sides (when filled). While a horizontal cross section of the the body is polygonal, the body may have a pleasing shape, as illustrated in FIG. 14, where a bottle 141 is shown with its sides notched out (as indicated by the numeral 142) providing an "hour glass" or other desirable shape. The notching preferably is accomplished at the same time as material 53 is cut away. The bottle of FIG. 14 is shown in the same condition as the bottle of FIG. 19, namely flat, and without fitment inserted.

For explanatory purposes, the figures show a "turret" type of device for holding the bottles at spaced stations A, B, C, and D, and transporting them between stations. It will be appreciated by those skilled in the art that other suitable transport means could be used to accomplish the same function, i.e., a chain running around a pair of sprockets, a carousel, pallets travelling down a track, or other means. And, as suggested above, the number of turret arms is not necessarily six.

Figure 21:
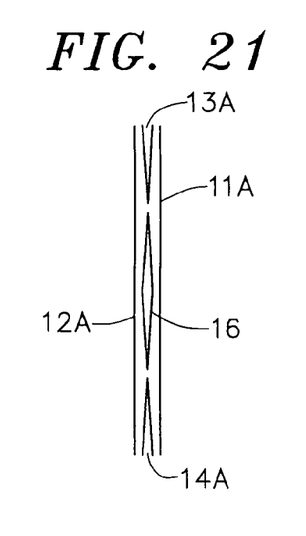
FIG. 21 is an end on view of webs that can be used to form the bottle of FIG. 1B, two up.

At the outset, reference was made to the possibility of fabricating a bottle "two-up". FIG. 21 depicts a web configuration that could be used for "two-up" production of a four sided bottle. Webs 11A, 12A, 13A, and 14A correspond to webs 11, 12, 13, and 14 of FIG. 3B. An additional web 16 (with two folds) occupies the central area. It will be appreciated that by slitting the web configuration depicted in FIG. 21 down the middle, two webs of the configuration shown in FIG. 3B will be created. Hence, the web configuration shown in FIG. 21 can result in two lines proceeding side by side, utilizing two turrets, two fitment arms, etc. Of course, at some point during fabrication, preferably just before attachment of the nascent bottles to the turret, the web must be slit into two parallel webs. Slitting webs is a common procedure in the art, and, accordingly, need not be discussed in detail.

What has been described is a process for fabricating a flexible bottle, with a fitment. The process has been described in detail with reference to specific embodiments. Persons skilled in the art will, no doubt, utilize the principles disclosed herein in connection with embodiments differing in some details from those described, but nevertheless within the spirit of the invention as defined in the below claims. Such changed embodiments, as well as such changes in the process of making the invented bottle as will occur to those skilled in the art, are intended to be covered by the following claims, which define the invention.

I claim:

1. A method of fabricating a multisided flexible bottle that includes a neck section containing a fitment, a transition section, a body section, and a bottom section, which method comprises the steps of:

providing a fabricating machine which accepts webs at an input and processes said webs between said input and an output, said webs being processed being fed from said input toward said output;

feeding a plurality of webs into said fabricating machine, said webs being comprised of flexible films, said webs being disposed so as to provide i) top and bottom laminations, and ii) at least one folded gusset;

forming initial perimeter seams defining at least said neck section, but not including said bottom section, said neck section being the portion of said bottle fed into said machine first;

cutting away the material outside said perimeter seams at said neck section;

inserting a fitment into said neck section, said insertion being in the direction said web is being fed;

forming the perimeter seams around the portions of said bottle not formed in the initial perimeter seaming step;

severing said bottle from said web; and sealing said neck section to said fitment.

2. A method of fabricating a flexible bottle as recited in claim 1 wherein said sealing of said neck section to said fitment is accomplished by applying heat and pressure on said neck section against said fitment.

3. A method of fabricating a flexible bottle as recited in claim 2, wherein the step of applying heat and pressure to said neck section against said fitment is performed more than one time, and wherein the application of heat and pressure in at least two of said times is from different radial angles.

4. A method of fabricating a flexible bottle as recited in claim 3 wherein the difference between said different radial angles is about 90 degrees.

5. A method of fabricating a flexible bottle as recited in claim 1 wherein said sealing of said neck section to said fitment is accomplished by applying ultrasonic energy to said neck section against said fitment.

6. A method of fabricating a flexible bottle as recited in claim 5, wherein the step of applying ultrasonic energy to said neck section against said fitment is performed more than one time, and wherein the application of ultrasonic energy in at least two of said times is from different radial angles.

7. A method of fabricating a flexible bottle as recited in claim 6 wherein the difference between said different radial angles is about 90 degrees.

8. A method of fabricating a flexible bottle as recited in claim 1 wherein sealing of said neck section to said fitment is accomplished by causing at least one heated wheel to traverse the periphery of said neck section, applying pressure against said fitment.

9. A method of fabricating a four sided flexible bottle that includes a neck section containing a fitment, a transition section, a body section, and a bottom section, which method comprises the steps of:
  providing a fabricating machine which accepts webs at an input and processes said webs between said input and an output, said webs being processed being fed from said input toward said output;
  feeding a plurality of webs into said fabricating machine, said webs being comprised of flexible films, said webs being disposed to provide i) a pair of folded gussets, each gusset having an upper face and a lower face, and ii) top and bottom laminations, said top and bottom laminations abutting the upper and lower faces of said folded gussets respectively, the folds of said gussets being adjacent each other;
  forming initial perimeter seams at the sides of at least said neck section, but not including said bottom section, said neck section being the portion of said bottle fed into said machine first
  cutting away the material outside said perimeter seams at said neck section; inserting a fitment into said neck section, said insertion being in the direction said web is being fed;
  forming perimeter seams around the portions of said bottle not formed in said initial perimeter seaming step;
  severing said bottle from said web; and
  sealing said neck section to said fitment.

10. A method of fabricating a flexible bottle as recited in claim 9 wherein said sealing of said neck section to said fitment is accomplished by applying heat and pressure on said neck section against said fitment.

11. A method of fabricating a flexible bottle as recited in claim 10, wherein the step of applying heat and pressure on said neck section against said fitment is performed more than one time, at least two of said times said heat and pressure are applied being from different radial angles.

12. A method of fabricating a flexible bottle as recited in claim 11 wherein the difference between said different radial angles is about 90 degrees.

13. A method of fabricating a flexible bottle as recited in claim 9 wherein said sealing of said neck section to said fitment is accomplished by applying ultrasonic energy to said neck section against said fitment.

14. A method of fabricating a flexible bottle as recited in claim 13, wherein the step of applying heat and pressure on said neck section against said fitment is performed more than one time, at least two of said times said heat and pressure are applied being from different radial angles.

15. A method of fabricating a flexible bottle as recited in claim 14 wherein the difference between said different radial angles is about 90 degrees.

16. A method of fabricating a flexible bottle as recited in claim 9 wherein said heat and pressure are applied using wheels that traverse the periphery of said neck.

17. A method of sealing the base of a fitment to a container, wherein said container has a neck section within which said fitment is placed, comprising the steps of:
  providing one or more heated clamping means each having an internal shape substantially corresponding to the shape of said base;
  inserting the base of said fitment into said neck section;
  causing one of said clamping means to exert pressure on said neck section against said base a first time; and
  causing one of said clamping means to exert pressure on said neck section against said base a second time, said second exertion of pressure being at a different angular direction with respect to said base.

18. A method of sealing the base of a fitment to a container as recited in claim 17 wherein said first and said second exertions of pressure are accomplished by different clamping means.

19. A method of sealing the base of a fitment to a container as recited in claim 18 and further including the step of turning said container between said first and second exertions of pressure.

20. A method of sealing the base of a fitment in a container as recited in claim 17 wherein said first and said second exertions of pressure are accomplished by the same clamping means.

21. A method of sealing the base of a fitment to a container as recited in claim 20 and further including the step of turning said container between said first and second exertions of pressure.

22. A method for sealing the neck of a flexible bottle to a fitment comprising:
  providing a flexible bottle having a neck section;
  positioning a fitment having a base within said neck section;
  providing one or more rotatable members, said rotatable members having axes about which said rotatable members can rotate;
  positioning said rotatable members against said neck, said rotatable members pressing said neck against said base;
  causing energy to flow from said rotatable members to said neck and base to create a seal therebetween; and
  causing relative movement between the axes of said rotatable members and said neck whereby each of said rotatable members are caused to traverse at least a portion of the circumference of said neck.

23. The method for sealing the neck of a flexible bottle to a fitment as recited in claim 22, wherein the number of rotatable members is two, and said two rotatable members are positioned to press against opposing sides of said neck.

24. The method for sealing the neck of a flexible bottle to a fitment as recited in claim 22, wherein the type of energy used to create said seal is heat energy.

25. The method for sealing the neck of a flexible bottle to a fitment as recited in claim 22, wherein the type of energy used to create said seal is ultrasonic energy.

26. The method for sealing the neck of a flexible bottle to a fitment as recited in claim 22, wherein each of said rotatable members is substantially circular and is driven by a motor, and said fitment is free to rotate about its axis.

27. A method of inserting a fitment into the neck section of a flexible container being fabricated, said container having a top portion and a bottom portion, said neck section being in said top portion, and said fitment having a base, which comprises the steps of:
  providing a fabricating machine which accepts webs at an input and processes said webs between said input and an output, said webs being processed being fed from said input toward said output;
  intermittently feeding a plurality of webs into said fabricating machine as the material for a flexible container;
  forming seams attaching said webs along at least a portion of what is intended to become the perimeter of said container at said top portion, said seams defining a neck section of said container therebetween;
  placing a fitment on a mandrel;
  separating said webs at said bottom portion;
  inserting said mandrel between said webs and positioning the base of said fitment in said neck section, the positioning motion being in the direction the web is being fed;
  sealing said neck section to said base of said fitment; and
  withdrawing said mandrel.

28. A method of inserting a fitment into the neck of a flexible container being fabricated as recited in claim 27 wherein said plurality of webs includes first and second flat webs and first and second folded gusset webs therebetween, and wherein said seams attach said first and second flat webs to said folded gusset webs to form said neck section.

29. A method of inserting a fitment into the neck of a flexible container being fabricated as recited in claim 28 wherein said first and second folded gusset webs are portions of the same piece of material as one of said flat webs.

30. A method of inserting a fitment into the neck of a flexible container being fabricated as recited in claim 28 wherein said first and second folded gusset webs and said first and second flat webs are four separate pieces of material.

31. A method of inserting a fitment into the neck of a flexible container being fabricated as recited in claim 27 wherein said first and second flat webs and said folded gusset webs each have predetermined widths, and further including the step of cutting away portions of each of said webs at said neck section whereby said neck section will have a reduced size.

32. A method of inserting a fitment into the neck of a flexible container being fabricated as recited in claim 27 wherein the insertion is made through said bottom portion.

33. A method of inserting a fitment into the neck of a flexible container being fabricated as recited in claim 32 wherein said plurality of webs includes first and second flat webs and first and second folded gusset webs therebetween, and wherein said seams attach said first and second flat webs to said first and second folded gusset webs to form said neck section.

34. A method of inserting a fitment into the neck of a flexible container being fabricated as recited in claim 33 wherein the inner circumference of said neck section is no greater than about 3% larger than the circumference of the base of said fitment.

35. A method of attaching the base of a fitment to a container, wherein said container has a neck section within which said fitment is placed, comprising the steps of:
  placing the base of said fitment within said neck section;
  applying seaming energy for a first predetermined time to a first area of said neck section, pressing said first area against said base; and
  applying seaming energy for a second predetermined time to a second area of said neck section, said second area circumferentially overlapping said first area, pressing said second area against said base.

36. A method of attaching the base of a fitment to a container as recited in claim 35 wherein said seaming energy is comprised of heat.

37. A method of attaching the base of a fitment to a container as recited in claim 35 wherein said seaming energy is comprised of ultrasonic energy.

38. A method of attaching a fitment to a flexible container being fabricated from one or more webs, said container including a neck section having a longitudinal axis parallel to the direction said webs are being fed, which comprises:
  providing a fabricating machine which accepts said webs at an input and processes said webs between said input and an output, said webs being processed being fed from said input toward said output;
  feeding one or more webs of flexible material into said fabricating machine;
  forming seams between plies of said material to form said neck section of said container;
  feeding a fitment having a base into said neck section in a direction parallel to the longitudinal axis of said neck section; and
  applying seaming energy to the interface between said neck section and the base of said fitment.

39. A method of attaching a fitment to the neck section of a flexible container as recited in claim 38 wherein said seaming energy is comprised of heat.

40. A method of attaching a fitment to the neck section of a flexible container as recited in claim 38 wherein said seaming energy is comprised of ultrasonic energy.

41. A method of attaching a fitment to the neck section of a flexible container as recited in claim 38 wherein the step of applying seaming energy to the interface between said neck section and the base of said fitment comprises:
  applying seaming energy for a first predetermined time to a first area of said neck section, pressing said first area against said base; and
  applying seaming energy for a second predetermined time to a second area of said neck section, said second area circumferentially overlapping said first area pressing said second area against said base.

42. A method of attaching a fitment to the neck section of a flexible container as recited in claim 38 wherein said seaming energy is comprised of heat.

43. A method of attaching a fitment to the neck section of a flexible container as recited in claim 38 wherein said seaming energy is comprised of ultrasonic energy.

* * * * *